United States Patent [19]
LeQuire

[11] Patent Number: 5,554,058
[45] Date of Patent: Sep. 10, 1996

[54] MARINE ENGINE EXHAUST SYSTEM AND ASSOCIATED METHOD

[75] Inventor: Wayne A. LeQuire, Blount County, Tenn.

[73] Assignee: Ultra Marine Products, Inc., Louisville, Tenn.

[21] Appl. No.: 499,679

[22] Filed: Jul. 7, 1995

[51] Int. Cl.⁶ .................................................. B63H 21/10
[52] U.S. Cl. ............................. 440/89; 60/310; 181/260
[58] Field of Search ...................... 440/89, 88; 60/310; 181/212, 213, 220, 260

[56] References Cited

U.S. PATENT DOCUMENTS

| | | | |
|---|---|---|---|
| 2,360,429 | 10/1944 | Leadbetter | 181/260 |
| 2,498,979 | 2/1950 | Bourne | 181/52 |
| 3,296,997 | 1/1967 | Hoiby et al. | 440/89 |
| 4,713,029 | 12/1987 | Ford | 440/89 |
| 4,917,640 | 4/1990 | Miles, Jr. | 440/89 |
| 5,045,005 | 9/1991 | Miles et al. | 440/89 |
| 5,147,232 | 9/1992 | Miles et al. | 440/89 |
| 5,259,797 | 11/1993 | Miles | 440/89 |

Primary Examiner—Jesus D. Sotelo
Attorney, Agent, or Firm—Pitts & Brittian, P.C.

[57] ABSTRACT

A marine engine exhaust system (10) and method for use with a marine engine. The exhaust system (10) includes a muffler body (20) defining an internal cavity (22) for receiving exhaust gases from a marine engine (12), the cavity (22) defining a reservoir portion (28) for holding water. The exhaust system (10) also includes at least one inlet passageway (24) communicating with the cavity (22) for receiving exhaust gases from the engine (12) and communicating them to the cavity (22). At least one water supply passageway (32) is provided which communicates with the cavity (22) and which is placed in fluid communication with a water supply such that water can be communicated to the reservoir portion (28). Further, at least one outlet passageway (40) is provided through which exhaust gases and water are ejected from the cavity (22). The outlet passageway (40) has an inlet port (42) disposed in the reservoir portion (28) of the cavity (22) and has an outlet port (44) exterior to the muffler body (20). The method of the invention includes the steps of communicating exhaust gases under pressure to the cavity (22) through the inlet passageway (24), and injecting water into the cavity (22) through the water supply passageway (32).

4 Claims, 2 Drawing Sheets 5,554,058

MARINE ENGINE EXHAUST SYSTEM AND ASSOCIATED METHOD

TECHNICAL FIELD

This invention relates to an exhaust system for marine engines. In this particular invention the exhaust system includes a muffler body defining an inlet passageway, a water supply passageway, and an outlet passageway. In accordance with the method of the invention, exhaust gases are received into the muffler body through the inlet passageway, water is injected into the muffler body through the water supply passageway, and exhaust gases and water are ejected from the muffler body through the outlet passageway.

BACKGROUND ART

It is common for a marine engine to be provided with a water pump which draws water from outside of the hull of the operatively associated marine vehicle and pumps the water through a water jacket defined by the engine block in order to cool the engine. The water which has been pumped through the engine block generally exits the engine through the exhaust manifold of the engine. As a consequence of the dumping of cooling water into the exhaust manifold, marine mufflers have been designed which utilize the used cooling water to cool the exhaust gases exiting the exhaust manifold and to attenuate engine noise. In this regard, such marine mufflers commonly include a muffler body defining an internal cavity for receiving both the hot exhaust gases and the cooling water ejected from the manifold. At least one outlet passageway is provided which has an inlet port proximate the bottom of the cavity and an outlet port which is exterior to the muffler body. Cooling water exiting the exhaust manifold collects in the bottom of the cavity of the muffler body, such that the inlet port of the outlet passageway is submerged in water. Pressure within the cavity from the injection of exhaust gases forces the exhaust gases through the water and forces both the exhaust gases and water through the outlet passageway and out of the muffler body. The forcing of the exhaust gases through the used cooling water serves to both cool the gases and to attenuate engine noise. Examples, of mufflers and exhaust systems utilizing this concept are disclosed in U.S. Pat. Nos. 5,259,797; 5,147,232; 5,045,005; 4,917,640; 4,713,029; 3,296,997; 2,498,979; and 2,360,429.

Recently marine engines have been produced in which the used cooling water is pumped into an outlet conduit which directs the used cooling water out of the hull of the marine vehicle. Thus, little or no cooling water is dumped into the exhaust manifold of the engine. By diverting the used cooling water rather than directing it into the exhaust manifold, back pressure on the engine is reduced, and the engine runs more efficiently. Certain jet ski engines utilize this technique to enhance the power of the small engines which they utilize, and the technique can be advantageous in various marine engine applications. However, where the cooling water is directed out of the engine and through the hull, rather than through the exhaust system, little or no water is provided to the muffler to cool the exhaust or to muffle engine noise. Accordingly, conventional marine mufflers which utilize water to cool the exhaust gases and attenuate engine noise do not function properly. Of course, a different type of muffler can be used, such as a muffler of the type used on automobiles, but the advantages of cooling of the exhaust gases with water are lost.

Therefore, it is an object of the present invention to provide a marine engine exhaust system and method which utilizes water to cool the exhaust gases and to attenuate engine noise, but which is not dependant upon a supply of used engine cooling water from the engine exhaust manifold for operation.

Yet another object of the present invention is to provide a marine engine exhaust system which utilizes the water pump of the marine engine to supply water to the exhaust system such that a separate water supply mechanism is not required.

It is another object of the present invention to provide a marine engine exhaust system which is inexpensive to manufacture and maintain.

SUMMARY OF THE INVENTION

The present invention provides a marine engine exhaust system and method for use with a marine engine. The exhaust system includes a muffler body defining an internal cavity for receiving exhaust gases from the engine, the cavity defining a reservoir portion disposed in a bottom of the muffler body for holding water. The exhaust system also includes at least one inlet passageway communicating with the cavity of the muffler body for receiving hot exhaust gases from the marine engine and communicating the exhaust gases to the cavity of the muffler body. At least one water supply passageway is provided which communicates with the cavity of the muffler body, and which is placed in fluid communication with a water supply such that water can be communicated to the reservoir portion of the cavity. In the preferred embodiment the water supply comprises the water pump which supplies the marine engine with cooling water, and the water supply passageway communicates with the supply line through which the water pump draws water from outside of the hull of the marine vehicle. Further, at least one outlet passageway is provided through which exhaust gases and water are ejected from the cavity of the muffler body. The outlet passageway has an inlet port disposed in the reservoir portion of the cavity of the muffler body and has an outlet port exterior to the muffler body.

The method of the present invention includes the steps of communicating exhaust gases under pressure to the cavity of a muffler body through the inlet passageway, and injecting water into the cavity through the water supply passageway, whereby water is supplied to the reservoir portion of the cavity. The injection of hot exhaust gases in to the cavity of the muffler body increases the pressure within the cavity, whereby exhaust gases are forced through the water in the reservoir portion and the exhaust gases and water are expelled from the muffler body through the outlet passage. The passage of the exhaust gases through the water in the reservoir serves both to cool the exhaust gases and to attenuate the noise generated by the marine engine.

BRIEF DESCRIPTION OF THE DRAWINGS

The above mentioned features of the invention will be more clearly understood from the following detailed description of the invention read together with the drawings in which.

BEST MODE FOR CARRYING OUT THE INVENTION

Figure 1:
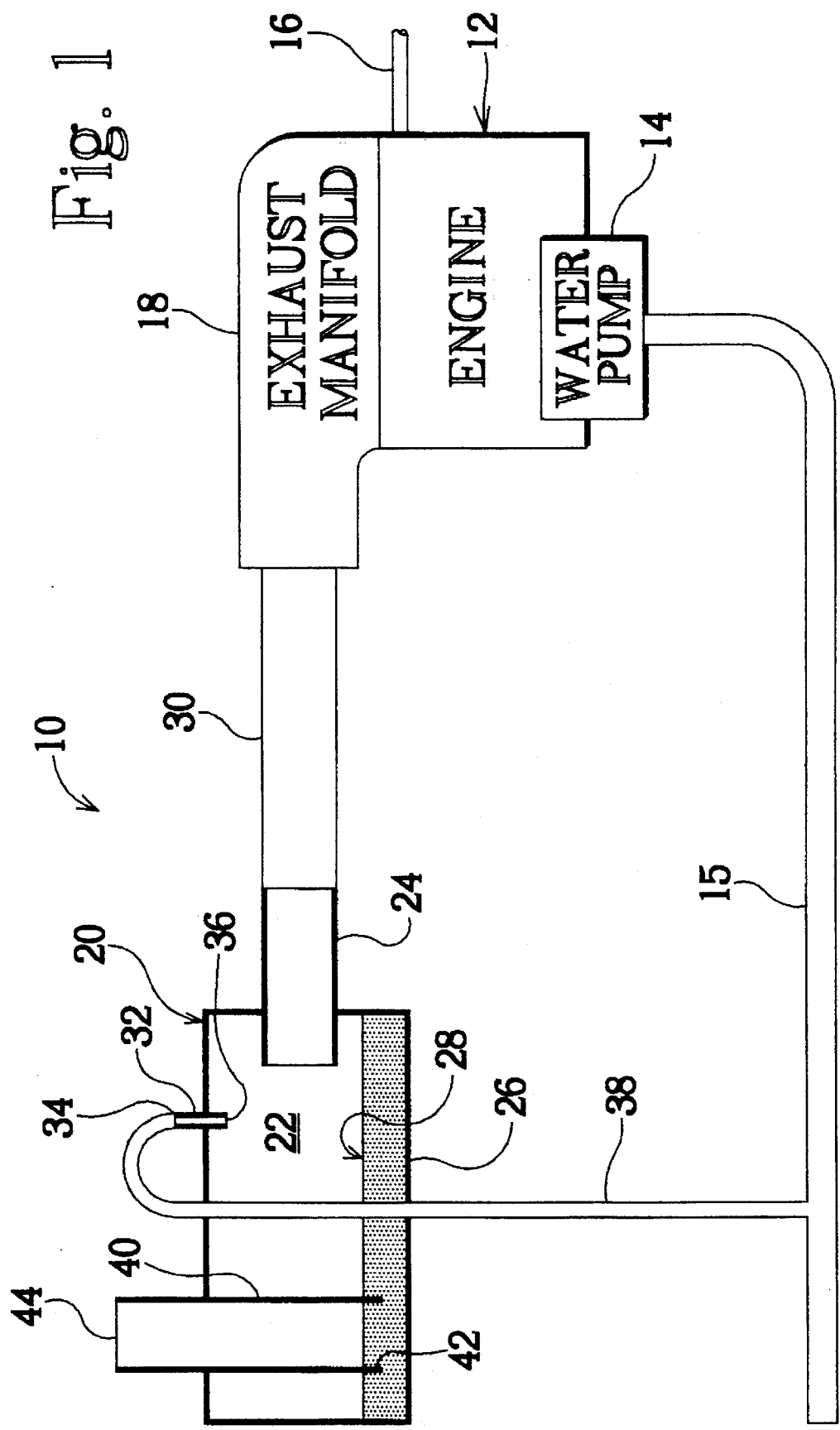
FIG. 1 is a diagrammatic illustration of a marine engine exhaust system of the present invention.

A marine engine exhaust system incorporating various features of the present invention is diagrammatically illustrated and referenced at 10 in FIG. 1, with the engine of a marine vehicle being diagrammatically illustrated at 12. The engine 12 is provided with a water supply system, including a water pump 14, which supplies water to the engine to cool the engine 12 during operation. In this regard, it will be recognized by those skilled in the art that the water pump 14 draws water from the body of water surrounding the hull of the marine vehicle through a supply line 15 in order to provide cooling water to the engine 12. Whereas in many marine engines the cooling water which has been circulated through the engine is ejected into the exhaust manifold of the engine and exits the vehicle through the exhaust system, in the illustrated marine engine 12 a cooling water removal conduit 16 is provided for carrying cooling water from the engine and out of the marine vehicle. It will be understood by those skilled in the art that by not directing the cooling water into the exhaust manifold 18, back pressure on the engine generated in the exhaust manifold 18 is reduced, thereby enhancing the performance of the engine 12.

Figure 2:
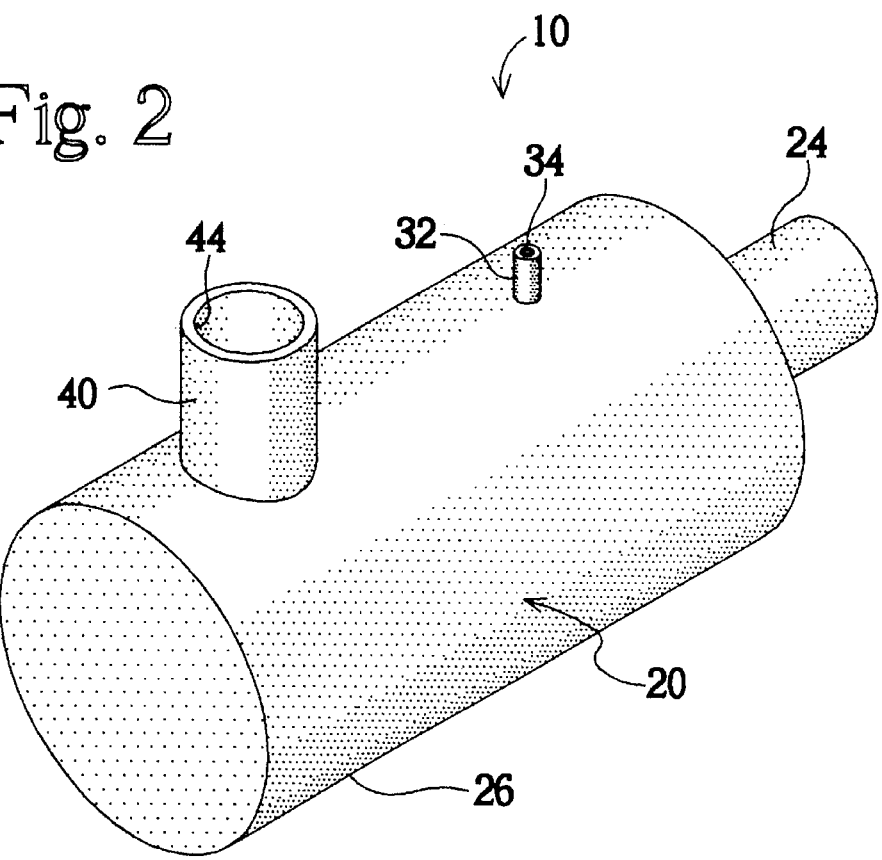
FIG. 2 illustrates a perspective view of a marine engine exhaust system of the present invention.
Figure 3:
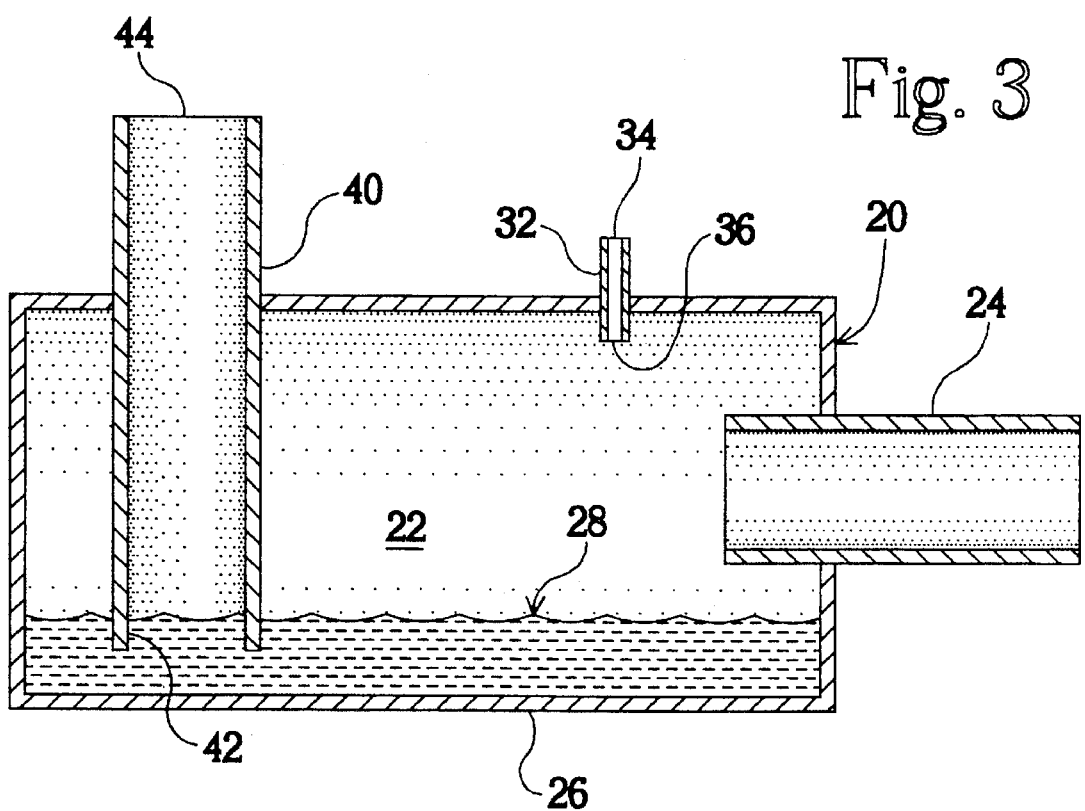
FIG. 3 illustrates a side elevation view, in section, of a marine engine exhaust system of the present invention.

As illustrated in FIGS. 1–3, the exhaust system 10 of the present invention includes a muffler body 20 defining an internal cavity 22. At least one inlet passageway 24 is provided for communicating exhaust from the exhaust manifold 18 to the cavity 22. The inlet passageway 24 engages the body 20, and communicates with the cavity 22, at a point selectively spaced from the bottom 26 of the muffler body 20 such that the lower portion of the body 20 defines a reservoir portion 28 for holding a quantity of water. The inlet passageway 24 is placed in fluid communication with the exhaust manifold 18 with a suitable conduit 30, as illustrated in FIG. 1, such that exhaust gases are communicated from the manifold 18 to the cavity 22 during the operation of the engine 12.

It will be noted that, although the illustrated embodiment of the invention depicts a muffler body 20 having a single inlet passageway 24, for some applications it may be desirable to provide an plurality of exhaust inlet passageways 24 communicating between the exhaust manifold 18 and the cavity 22.

The exhaust system 10 also includes a water supply apparatus for supplying water to the cavity 22 of the muffler body 20. In the preferred embodiment the water supply apparatus includes a water supply passageway 32 which communicates through the muffler body 20, and which, in the preferred embodiment, defines an outlet port 34 within the cavity 22 and an inlet port 36 exterior the body 20 for being placed in fluid communication with a water supply source. More specifically, in the preferred embodiment the inlet port 36 is connected via a supply conduit 38 to the supply line 15 which communicates water between the exterior of the hull of the marine vehicle and the water pump 14. Accordingly, the water pump 14 serves to pump water to both the engine 12 for cooling the engine and to the cavity 22 of the muffler body, thereby obviating the need for a separate pump means for supplying water to the cavity 22.

This notwithstanding, it is contemplated that a separate pump can be provided for supplying water to the cavity 22, and use of the water pump 14 is simply illustrative of one preferred embodiment of the system 10. Further, it is contemplated that, when the water pump 14 is used to supply water to the cavity 22, the supply conduit 38 can be connected on the output side of the pump 14, rather than to the supply line 15, if desired. For example, the supply conduit 38 can communicate with the output conduit (not shown) which communicates between the pump 14 and the engine 12, or with the water jacketing system of the engine itself. However, it will be recognize by those skilled in the art that in many marine vehicles the supply line 15 runs in close proximity to the space provided for the marine muffler, such that connection of the supply conduit 38 to the supply line 15 facilitates installation of the exhaust system.

The exhaust system 10 also includes at least one outlet passageway 40 for carrying exhaust gases and water out of the cavity 22 of the muffler body 20. In this regard, the outlet passageway 40 is substantially vertically disposed in the preferred embodiment, and defines a lower inlet opening 42 which is disposed within the cavity 22 proximate the bottom 26 of the body 20 such that during operation of the exhaust system the inlet opening 42 is submerged in water. The outlet passageway 40 extends through the upper wall of the body 20 and defines an upper outlet opening 44 through which exhaust gases and water are ejected. Thus, in accordance with the marine exhaust method of the present invention, hot exhaust gases from the exhaust manifold 18 are communicated under pressure to the inlet passageway 24 through the conduit 30, and are directed into the cavity 22 by the inlet passageway 24. Further, water is pumped into the cavity 22 through the water supply passageway 32. Thus, notwithstanding the diversion of cooling water through the water removal conduit 16, the cavity 22 is supplied with water.

As the result of pressure building in the cavity 22 due to the injection of hot exhaust gases, both exhaust gases and water are forced up the outlet passageway 40. As the exhaust gases are forced through the water in the reservoir 28, the gases are cooled and engine noise is attenuated or muffled. Accordingly, the exhaust system 10 serves to both cool the exhaust gases, thereby reducing the risk of fire, and to reduce engine noise, while still allowing performance of the engine 12 to be enhance by diverting cooling water which would normally be dumped in to the exhaust manifold 18.

In light of the above it will be recognized that the present invention provides marine engine exhaust system and method having great advantages over the prior art. However, while a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A marine engine exhaust system for use with a marine engine of a marine vehicle, the marine vehicle having a cooling system, including a water pump, for injecting water into the marine engine for cooling the marine engine, said exhaust system comprising:

a muffler body defining an internal cavity for receiving exhaust gases, said cavity defining a reservoir portion disposed in a bottom portion of said muffler body for holding water;

at least one first passageway communicating with said cavity of said muffler body for receiving said exhaust gases from said marine engine whereby said exhaust gases are communicated to said cavity of said muffler body;

at least one second passageway communicating with said cavity of said muffler body for being placed in fluid communication with the cooling system of the marine vehicle at a point upstream from the point at which the cooling system injects water into the marine engine, whereby water taken from the cooling system at a point upstream from the point at which the cooling system injects water into the marine engine is communicated to said reservoir portion of said cavity by the water pump of the cooling system; and at least one third passageway through which said exhaust gases and water are ejected from said cavity of said muffler body, said third passageway having an inlet port disposed in said reservoir portion of said cavity of said muffler body and having an outlet port exterior to said muffler body.

2. A method for handling the exhaust gases from a marine engine of a marine vehicle, the marine vehicle having a cooling system, including a water pump, for injecting water into the marine engine for cooling the marine engine, said method comprising the steps of:

communicating said exhaust gases under pressure to the internal cavity of a muffler body through at least one first passageway in said muffler body, said internal cavity defining a reservoir portion disposed in a bottom portion of said muffler body for holding water, said muffler body having an second passageway for expelling said exhaust gases and said water from said internal cavity; and injecting water taken from the cooling system at a point upstream from the point at which the cooling system injects water into the marine engine into said internal cavity through at least one third passageway provided in said muffler body using the water pump of the marine engine as a pumping means, whereby water is supplied to said reservoir portion of said internal cavity, and whereby pressure within said internal cavity generated by the communication of said exhaust gases to said internal cavity forces said exhaust gases through said water in said reservoir portion of said internal cavity and causes said exhaust gases and said water to be expelled from said muffler body through said second passage of said muffler body.

3. A marine engine exhaust system for use with a marine engine of a marine vehicle, the marine engine having a water pump for supplying water to cool the marine engine, the water pump being provided with a water supply conduit for communicating water to the water pump from outside of the hull of the marine vehicle, said exhaust system comprising:

a muffler body defining an internal cavity for receiving exhaust gases, said cavity defining a reservoir portion disposed in a bottom portion of said muffler body for holding water;

at least one first passageway communicating with said cavity of said muffler body for receiving said exhaust gases from said marine engine whereby said exhaust gases are communicated to said cavity of said muffler body;

at least one second passageway communicating with said cavity of said muffler body for being placed in fluid communication with the water supply conduit of the water pump of the marine engine, whereby water is communicated from the water supply conduit to said reservoir portion of said cavity; and at least one third passageway through which said exhaust gases and water are ejected from said cavity of said muffler body, said third passageway having an inlet port disposed in said reservoir portion of said cavity of said muffler body and having an outlet port exterior to said muffler body.

4. The marine engine exhaust system of claim 3 wherein said system includes a further water supply conduit extending between said second passageway and said water supply conduit of the water pump of the marine engine for communicating water drawn into the water supply conduit of the water pump to said reservoir portion of said cavity, whereby the water pump of the marine engine supplies water for the operation of the marine engine exhaust system.

* * * * *